May 1, 1951   R. L. ALDER   2,551,407
CONSTANT CURRENT REGULATING CIRCUIT
Filed Nov. 22, 1948
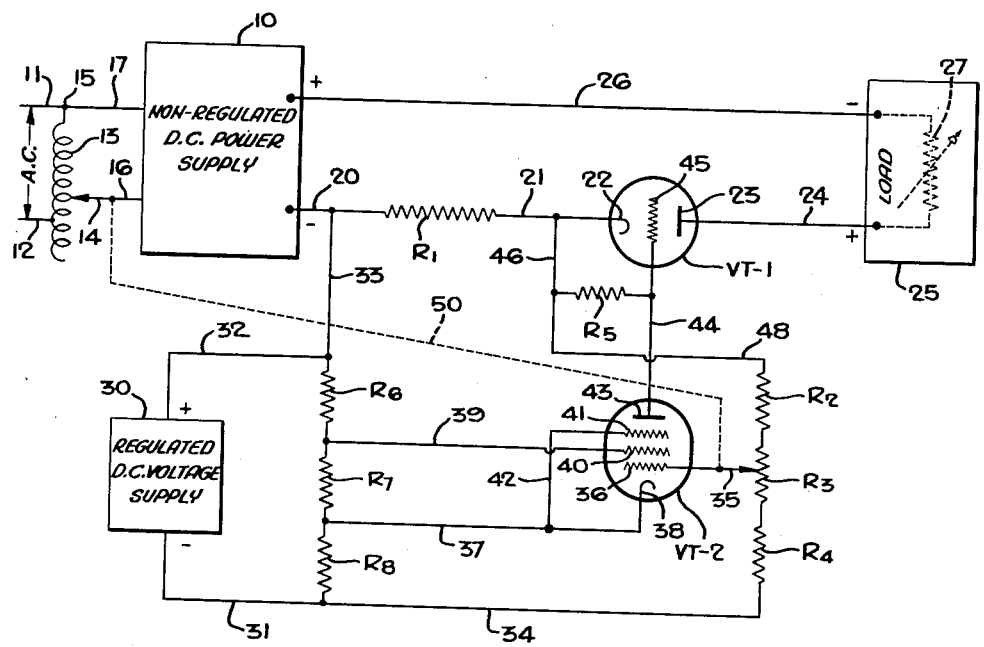
ROBERT L. ALDER,
INVENTOR.
BY Lyle Dalton
ATTORNEY Patented May 1, 1951

2,551,407

UNITED STATES PATENT OFFICE 2,551,407

CONSTANT CURRENT REGULATING CIRCUIT

Robert Lee Alder, La Canada, Calif., assignor to Lane-Wells Company, Los Angeles, Calif., a corporation of Delaware Application November 22, 1948, Serial No. 61,440

8 Claims. (Cl. 323—22)

This invention relates to current regulators in general and more particularly to electronic current regulating apparatus for maintaining a constant current flow from an unregulated current source to a variable load.

This invention finds one of its important uses in connection with electrical logging methods and apparatus such as those disclosed in copending application Serial No. 52,747 filed October 4, 1948, wherein formation resistivities are continuously measured throughout a given length of a well borehole, under constant current input conditions.

In the drawings which show by way of illustration a wiring diagram of a preferred embodiment of the invention, the apparatus is as follows:

A non-regulated, direct current power supply is illustrated at 10 which may be of any suitable type such as, for example, batteries, motor generator, or the conventional apparatus for converting low voltage alternating current to a higher voltage direct current usually comprising an alternating current transformer, a vacuum tube rectifier and an output filter. The power supply 10 may be furnished with alternating current from a suitable primary power source through conductors 11 and 12 which lead to the primary winding portion of an autotransformer 13. The autotransformer 13 is provided with a tap switch 14 adapted to make sliding contact with a suitable number of the individual turns of the secondary portion of the winding of the autotransformer 13 to provide for a variable voltage output therefrom in a manner well known in the art. The autotransformer output is applied through conductors 16 and 17 to the beforementioned input to the direct current power supply 10.

The output of the direct current power supply makes connection through conductor 20, control resistor $R_1$, and conductor 21 to the cathode 22 of a triode electron tube VT—1 and thence from the anode 23 thereof, through conductor 24 to the variable load indicated at 25 and return through conductor 26. The load 25 in the case of an electrical logging device as hereinbefore mentioned where the load circuit comprises the variable resistivity current path through the various earth formations surrounding a well borehole between the electrical logging input electrodes, is largely resistive in nature as represented diagrammatically by the variable resistance 26.

A unidirectional voltage supply, suitably regulated to provide a substantially constant potential, is provided at 30. This voltage supply may be of conventional design such as, for example, an alternating current transformer, rectifier and an output filter system such as is commonly employed for such purposes, or it may comprise suitable batteries, a generator or the like apparatus capable of good output voltage regulation under moderate current output changes. In the case as here illustrated where a transformer, rectifier and filter system are employed, the output thereof is connected through conductors 31 and 32 across a series of voltage divider resistances as shown at $R_6$, $R_7$ and $R_8$ in order to obtain the several different voltages required. In event batteries are employed, voltage divider resistances are not required but instead the several different direct current voltages required may be obtained by suitable tap connections made to intermediate interconnecting points in the series of series connected battery cells. It is to be understood, therefore, that the voltage or potential supply and the terminals thereof, as described herein and in the claims, include the voltage differences appearing across divider resistances or across batteries or groups of series connected batteries and the various terminals thereof. The positive end of the series of voltage divider resistances $R_6$, $R_7$, $R_8$ is connected through conductor 33 with the beforementioned conductor 20 leading from the negative output terminal of the non-regulated direct current power supply 10 to the control resistor $R_1$. The negative end of the series of voltage divider resistances $R_6$, $R_7$ and $R_8$ is connected through conductor 34, and resistor $R_4$ to one end of the potentiometer $R_3$ and from there through the potentiometer contact arm 35 to the control grid 36 of a second vacuum tube VT—2. Connection is made from a point in the voltage divider resistances intermediate resistors $R_7$ and $R_8$ through conductor 37 to the cathode 38 of VT—2. Connection is also made from the voltage divider resistances intermediate resistors $R_6$ and $R_7$ through conductor 39 to the screen grid 40 of VT—2. The suppressor grid 41 of VT—2 is connected to the cathode 38 in the usual fashion, either through a connection within the electron tube or through an external conductor 42 depending upon the type of tube employed.

The anode 43 of VT—2 is connected through conductor 44 with the grid 45 of electron tube VT—1 and also through anode resistor $R_5$ and conductor 46 to conductor 21 which leads from the control resistor $R_1$ to the cathode 22 of VT—1. Conductor 46 also is connected through conductor 48 and resistor R2, to the other end of the potentiometer resistance R3, and thence through the beforementioned potentiometer contactor arm 35 to the control grid 36 of electron tube VT—2.

A mechanical coupling linking the autotransformer output voltage regulating switch 14 with the potentiometer arm 35 is illustrated in dotted lines as shown at 50 whereby motion of the autotransformer switch 14 to vary the output voltage of the direct current power supply 10 will automatically and simultaneously move the potentiometer contactor arm 35 upon the potentiometer resistance R3 in such manner as to vary the bias on the control grid of VT—2 in a manner and in accordance with a function hereinafter more fully described.

Operation of the apparatus of this invention is as follows:

A suitable alternating current such as, for example, a 60 cycle alternating current of 115 volts is applied to the input conductors 11 and 12 of the autotransformer 15. The output voltage from the autotransformer 15, adjusted to a suitable value by means of the regulator switch 14, is introduced through conductors 16 and 17 to the direct current power supply 10.

The direct current output from the power supply 10 flows through the circuit comprising conductor 20, control resistor R1 and conductor 21 to the cathode 22 of VT—1 and thence from the anode 23 thereof through conductor 24, variable resistance load 27 and return through conductor 26. In the hereinbefore mentioned example where, by way of illustration, the apparatus of this invention is considered to be employed in connection with an electrical logging system, the total variable resistance load represented at 27 and consisting of the sum of the resistance appearing between the input electrodes within a well borehole and the resistance of the conductor cable, may vary from approximately 1000 to 2000 ohms with an approximate total average working resistance of 1500 ohms. A suitable current to the electrical logging input electrodes, represented by the variable resistance load 25 may be approximately 100 milliamperes. Under these conditions, resistor R1 may have a value of approximately 1500 ohms and the voltage drop across VT—1 may be adjusted by proper bias on the grid 45 to a value of approximately 200 volts. Under these conditions, with a direct current power supply output at 10 of approximately 500 volts at the terminals between conductors 20 and 26, the beforementioned current of approximately 100 milliamperes will flow through the beforementioned load circuit comprising resistor R1, vacuum tube VT—1, load 25 and return through conductor 26.

The voltage supply 30 may be adapted to supply a potential of approximately 250 volts across the voltage divider resistances R6, R7 and R8, each of which will have a value of approximately 5000 ohms. Proper biasing potentials are thus supplied to the screen grid 40 of VT—2 and, in operation, a voltage is applied between the cathode 38 and anode 43 of approximately 316 volts, said voltage representing the sum of the voltage drop of 83.3 volts for each of the resistors R6 and R7 and a voltage of approximately 150 volts through resistor R1 when the current of approximately 100 milliamperes is flowing to the load 25. Under these conditions the contractor 35 of the potentiometer R3 is adjusted to apply a suitable bias on the control grid 36 of VT—2 such that the current flow through VT—2 and through resistor R5, which in this case may be approximately 2 megohms, is such that the bias on the grid 45 with respect to the cathode 22 of VT—1 just permits the said flow of 100 milliamperes therethrough to the load. With these adjustments having initially been made, any load resistance change at 25 due, for example, to movement of the electrical logging input electrodes through a well borehole to positions therein having different resistivities, causes the current drawn from the D. C. power supply to tend to change correspondingly. For example, if the resistance of the load illustrated at 25 reduces, for any reason, the current flowing from the direct current supply 10 through the circuit comprising resistor R1, electron tube VT—1 and conductors 24 and 26, momentarily increases above the desired normal value causing the potential drop across R1 to increase, thereby causing the potential at the conductor 21 to swing toward a more positive value, with respect to the cathode 38 of VT—2 and this change is communicated through conductor 48, resistor R2 and a portion of the potentiometer R3 and through the potentiometer contactor arm 35 to cause a corresponding reduction of the negative bias on control grid 36 with respect to the said cathode 38 of VT—2, which reduction is a direct function of the potential drop across resistor R1. The negative bias applied to the control grid of VT—2 is thus an inverse function of the current flow through resistor R1. This reduction in bias of control grid 36 results in an increase in the anode current through VT—2 and through conductor 44 and resistor R5 in turn causing, by the voltage drop through resistor R5, an increase in the negative bias on grid 45 with respect to cathode 22 of VT—1. This increase of negative grid bias in VT—1 results in an increase in the plate resistance thereof such as to substantially balance the beforementioned reduction in resistance through the load thereby maintaining the total resistance of the circuit substantially constant and thereby tending to return the momentarily increased current in the load circuit to its former, initially established value of 100 milliamperes.

In the opposite case where the load resistance increases, the current flowing through the circuit comprising resistance R1, electron tube VT—1 and conductors 24 and 26, momentarily reduces below the desired normal value causing a reduced potential drop across resistance R1 with a consequent increase of the negative bias on grid 36 of VT—2. The resultant momentary decrease in current flow through VT—2, conductor 44 and resistor R5 results in a decreased potential drop across resistance R5 with a consequent reduction in the negative bias on grid 45 with respect to cathode 22 of VT—1 which in turn reduces the plate resistance of VT—1 an amount approximately equal to the beforementioned increase in resistance of the load thereby maintaining the total resistance of the circuit substantially constant and thus tending to maintain the current flowing from the supply 10 through to the load 25 at the desired normal or initially established value of 100 milliamperes.

The current supply voltage to the load 25 may be adjusted to different selected values by any suitable means incorporated in the direct current power supply apparatus 10 or in the input thereto as from the autotransformer 15 or other adjusting means hereinbefore described. In the present embodiment of the invention illustrated herein, the output voltage of the autotransformer is varied by adjustment of the position of switch 14 to vary the primary to secondary turns ratio with a resultant proportional variation in the voltage output from the direct current power supply appearing across the output conductor 20 and 26 leading into the circuit comprising resistor $R_1$, electron tube VT—1, load 25 and conductor 26. However, any such variation in input direct current voltage would result in a corresponding momentary variation in the current through the circuit to the load 25, with attendant current regulation action similar to that hereinbefore described in connection with load resistance variations. For example, in event the voltage output from the direct current supply 10 is increased by any means such as by adjustment of switch 14 to increase the voltage output from the autotransformer 15 or by an increase in primary line voltage at 11, 12 or by other adjustment means within the current supply 10 itself, a momentarily increased current will flow through the circuit to the load 25. This increased current will result in an increased potential drop across the control resistance $R_1$ thereby reducing the negative bias on grid 36 with respect to cathode 38 of VT—2. This reduction in negative bias of grid 36 will result in an increased anode current from anode 43 through conductor 44, resistor $R_5$ to conductor 21 and return through resistor $R_1$ and conductor 33 to the voltage supply 30. This increased anode current will, by reason of the voltage drop through resistor $R_5$, result in an increased negative bias on grid 45, thereby resulting in an increased plate resistance of VT—1 sufficient to substantially off-set the beforementioned, initial increase in supply voltage to the circuit. The electron tube VT—1 thus assumes an increased voltage drop between cathode 22 and anode 23 thereof substantially equal to the said voltage increase from the direct current power supply 10, thus returning and maintaining the current flowing to the load 25, at a constant predetermined value.

Under some conditions, it may be desirable to change the value of the regulated current to the load 25. For example, it may be desirable to permit a regulated, constant current of 150 milliamperes to flow through the load 25 instead of the 100 milliampere current hereinbefore mentioned. As will be apparent from the foregoing description, the current regulation characteristics of the hereindescribed apparatus will not permit the current flow to the load 25 to be varied substantially from a predetermined constant value, by either the variation of the voltage output from the supply 10 or the variation of the resistance 27 of the load 25 or both. However, different predetermined, regulated load current values may be selected by adjustment of the potentiometer $R_3$. For example, a downward adjustment of the portion of potentiometer contact arm 35 upon the resistance of potentiometer $R_3$ will result in an increase in the negative bias of control grid 36 of VT—2, thereby decreasing the current flow from anode 43 through resistor $R_5$. This in turn will result in decreased negative bias on grid 45 of VT—1 which will cause a decrease in the plate resistance thereof permitting, while all other circuit conditions remain constant, an increased current flow therethrough to the load 25. An upward adjustment of the potentiometer arm 35 will have the opposite effect.

If the selection of a predetermined load current to be regulated is determined by adjustment of potentiometer 35, $R_3$ alone, while the voltage output from supply 10 and other characteristics of the circuits remain fixed, the operating point of electron tube VT—1 on its plate current-plate voltage characteristic curves for various grid bias voltages will be shifted along the dynamic characteristic curve toward one or the other ends of its operating range. This shift of operating range can be minimized, however, by simultaneously varying the voltage applied to the regulator tube VT—1 whenever the bias point of its grid, 45 is changed. Thus when the operating bias point of VT—1 is reduced to increase the regulated plate current through the tube VT—1 and flowing through the load 25, the plate voltage may be increased at the same time by increasing the output voltage from supply 10. Conversely, when it is desired to reduce the regulated current to the load 25, the operating bias of VT—1 is increased and at the same time the plate voltage may be decreased by decreasing the voltage output of supply 10. For convenience of operation, the contactor arm 35 of potentiometer $R_3$ may be mechanically coupled, as illustrated at 50 through suitable shafting or linkage, with the contactor arm 14 of the autotransformer 15 or with other suitable voltage control apparatus, whereby whenever the bias on grid 36 is increased or decreased with respective resultant decrease or increase in operating bias on grid 45 of VT—1, the voltage output from supply 10 may automatically be respectively increased or decreased and in a proper relationship thereto to maintain an ample range of current regulation in VT—1, on either side of the operating point.

Any suitable types of electron tubes may be employed at VT—1 and VT—2 as selected by one skilled in the art for the particular current regulation service to be performed. In the electric logging service as hereinbefore described by way of illustration and with the voltage and current values hereinbefore assumed in connection therewith, a twin triode type 6AS7G electron tube, with the like elements connected in parallel, has been found to be suitable. For such parallel operation it is advisable to connect each anode through a resistance of approximately 50 ohms (not shown) to the common anode current conductor, in order to insure equal distribution of the current between the two anodes. For electron tube VT—2 a 6SJ7G or 6SJ7GT pentode has been found to be suitable. Values of the several resistances shown in the drawing of the circuit, as employed in connection with the electron tubes and the voltages specified hereinbefore, may be, $R_1$, 1500 ohms; $R_2$, 650,000 ohms; $R_3$, 100,000 ohms; $R_4$, 150,000 ohms; $R_5$, 2 megohms; and $R_6$, $R_7$ and $R_8$ each 5000 ohms.

Obviously, for other services than that herein assumed for convenience of illustration, other electron tubes and other suitable voltages and circuit element values may be chosen by one skilled in the art.

It is to be understood that the foregoing is illustrative only, and that the invention is not limited thereby but includes all modifications thereof within the scope of definition of the appended claims.

What is claimed is:

1. Apparatus for supplying a constant current from a non-regulated current supply to a varying resistivity load comprising: a direct current supply; a first electron discharge device having a cathode, control electrode and anode; a control resistor; conductors connecting the negative terminal of said direct current supply through said control resistor to the cathode of said first electron discharge device and connecting the anode of said first discharge device through said load to the said positive terminal of said current supply; a second electron discharge device having at least a cathode, control electrode and anode; an anode resistor for said second discharge device, the anode of said second discharge device being connected to the control electrode of said first discharge device and also through said anode resistor to the cathode of said first discharge device; a direct current voltage supply means; conductors connecting a positive terminal of said voltage supply means through said control resistor and said anode resistor to the anode of said second discharge device; conductors connecting the cathode of said second discharge device with a second terminal of said voltage supply means which is negative with respect to said positive terminal; an adjustable bias voltage divider connection between the cathode-connected end of said control resistor and a third terminal of said voltage supply means which is negative with respect to said second terminal; and means connecting the control electrode of said second discharge device to an intermediate portion of said voltage divider connection.

2. Apparatus for supplying a constant current from a non-regulated current supply to a varying load, comprising: positive and negative terminals across which may be connected in series, a non-regulated direct current supply and a varying resistivity load; a first electron discharge device having a cathode, control electrode and anode; a control resistor; conductors connecting the said negative terminal through said control resistor to the cathode of said first electron discharge device; a conductor adapted to connect the anode of said first discharge device to said positive terminal; a second electron discharge device having at least a cathode, control electrode and anode; an anode resistor for said second discharge device, the anode of said second discharge device being connected to the control electrode of said first discharge device and also through said anode resistor to the cathode of said first discharge device; a direct current, substantially constant voltage supply means; conductors connecting a positive terminal of said voltage supply means through said control resistor and said anode resistor to the anode of said second discharge device; conductors connecting the cathode of said second discharge device with a second terminal of said voltage supply means which is negative with respect to said positive terminal; a bias connection between the cathode-connected end of said control resistor and a third terminal of said voltage supply means which is negative with respect to said second terminal; and means connecting the control electrode of said second discharge device with an intermediate portion of said bias connection.

3. Apparatus for supplying a constant current from a non-regulated current supply to a varying load, comprising: positive and negative terminals across which may be connected in series, a non-regulated direct current supply and a varying resistivity load; a first electron discharge device having a cathode, control electrode and anode; a control resistor; conductors connecting the said negative terminal through said control resistor to the cathode of said first electron discharge device; a conductor adapted to connect the anode of said first discharge device to said positive terminal; a second electron discharge device having at least a cathode, control electrode and anode; an anode resistor for said second discharge device, the anode of said second discharge device being connected to the control electrode of said first discharge device and also through said anode resistor to the cathode of said first discharge device; a direct current voltage supply means; conductors connecting a positive terminal of said voltage supply means through said control resistor and said anode resistor to the anode of said second discharge device; conductors connecting the cathode of said second discharge device with a second terminal of said voltage supply means which is negative with respect to said positive terminal; a bias resistance connected between the cathode-connected end of said control resistor and a third terminal of said voltage supply means which is negative with respect to said second terminal; and bias adjustment means connecting the control electrode of said second discharge device with an adjustably variable intermediate portion of said bias resistance.

4. Apparatus for supplying a constant current from a non-regulated current supply to a varying resistivity load comprising: positive and negative terminals across which may be connected in series, a non-regulated direct current supply and a varying resistivity load; a first electron discharge device having a cathode, control electrode and anode; a control resistor; conductors connecting the said negative terminal through said control resistor to the cathode of said first electron discharge device; a conductor connecting the anode of said first discharge device to said positive terminal; a second electron discharge device having at least a cathode, control electrode and anode; means for applying negative bias potential to the control electrode of said second discharge device with respect to the cathode thereof which is the sum of a substantially constant negative potential and a positive potential which is a direct function of the voltage drop across said control resistor when current is flowing therethrough to the load; means to apply a negative bias potential to the control electrode of said first discharge device with respect to the cathode thereof having a value which is a direct function of the anode current in said second discharge device as controlled by said bias potential applied to said control electrode of said second discharge device; and means to apply positive anode and negative cathode voltages to said second discharge device.

5. Apparatus for supplying a constant current from a non-regulated current supply to a varying resistivity load comprising: positive and negative terminals across which may be connected in series, a non-regulated direct current supply and a varying resistivity load; a first electron discharge device having a cathode, control electrode and anode; a control resistor; conductors connecting the said negative terminal through said control resistor to the cathode of said first electron discharge device; a conductor connecting the anode of said first discharge device to said positive terminal; a second electron discharge device having at least a cathode, control electrode and anode; a resistance having an adjustable, intermediate tap; a unidirectional, substantially constant bias voltage supply having a positive terminal thereof connected to the cathode of said second discharge device and its negative terminal connected to one end of said resistance; conductor means connecting the other end of said resistance to the cathode-connected end of said control resistor; a conductor connecting the said control electrode of said second discharge device with the said intermediate tap; an anode resistor for said second discharge device; conductors connecting the anode of said second discharge device to the control electrode of said first discharge device and also through said anode resistor to the cathode of said first discharge device; and means to apply positive anode and negative cathode voltages to said second discharge device.

6. Apparatus according to claim 1 with adjustable means to vary the voltage output of said direct current supply; and a coupling between said adjustable means and said adjustable bias voltage divider connection whereby both said voltage output and the bias on the control electrode of said second discharge device may be simultaneously varied.

7. Apparatus for supplying a constant current from a nonregulated current supply to a varying load comprising: a first electron discharge device having a cathode, control electrode and anode; a control resistor; conductor means adapted to connect said current supply, load, control resistor and first electron discharge device between cathode and anode thereof in a series circuit; a second electron discharge device having at least a cathode, control electrode and anode; voltage supply means for supplying a substantially constant voltage independent of variations in said current supply; conductor means connecting a positive terminal of said voltage supply means through said control resistor to said control electrode of said second electron discharge device; conductor means connecting a terminal of said voltage supply means which is negative with respect to said positive terminal, to said control electrode of said second electron discharge device; conductor means connecting a terminal of said voltage supply means which is positive with respect to said negative terminal to the cathode of said second electron discharge device whereby a negative bias potential thus applied to said control electrode with respect to the cathode of said second electron discharge device may be varied in accordance with an inverse function of the voltage drop across said control resistor when current is flowing therethrough to the load; and means to apply a negative bias potential to the control electrode of said first discharge device with respect to the cathode thereof having a value which is substantially a direct function of the anode current in said second discharge device as controlled by said bias potential applied to said control electrode of said second discharge device.

8. Apparatus according to claim 3 with adjustable means to vary the voltage output of said direct current supply; and a coupling between said adjustable means and said bias adjustment means whereby both said voltage output of said direct current supply and the bias on the control electrode of said second discharge device may be simultaneously varied.

ROBERT LEE ALDER.

REFERENCES CITED

The following references are of record in the file of this patent:

UNITED STATES PATENTS

| Number | Name | Date |
| --- | --- | --- |
| 1,874,981 | Hansell | Aug. 30, 1932 |
| 2,210,394 | Braden | Aug. 6, 1940 |
| 2,302,900 | Vance | Nov. 24, 1942 |
| 2,394,891 | Bowie | Feb. 12, 1946 |
| 2,447,507 | Kenyon | Aug. 24, 1948 |